US011297163B2

(12) United States Patent
Yan et al.

(10) Patent No.: US 11,297,163 B2
(45) Date of Patent: Apr. 5, 2022

(54) SCENARIO PROFILE BASED PARTITIONING AND MANAGEMENT OF APPLICATION CODE

(71) Applicant: INTEL CORPORATION, Santa Clara, CA (US)

(72) Inventors: Shoumeng Yan, Shanghai (CN); Xiao Dong Lin, Shanghai (CN); Yao Zu Dong, Shanghai (CN); Zhen Zhou, Shanghai (CN); Bin Yang, Shanghai (CN)

(73) Assignee: Intel Corporation

( * ) Notice: Subject to any disclaimer, the term of this patent is extended or adjusted under 35 U.S.C. 154(b) by 0 days.

(21) Appl. No.: 16/973,856

(22) PCT Filed: Jan. 17, 2019

(86) PCT No.: PCT/CN2019/072170
§ 371 (c)(1),
(2) Date: Dec. 10, 2020

(87) PCT Pub. No.: WO2020/147068
PCT Pub. Date: Jul. 23, 2020

(65) Prior Publication Data
US 2021/0368023 A1 Nov. 25, 2021

(51) Int. Cl.
*H04L 67/00* (2022.01)
*H04L 67/04* (2022.01)
*H04L 67/50* (2022.01)

(52) U.S. Cl.
CPC .............. *H04L 67/34* (2013.01); *H04L 67/04* (2013.01); *H04L 67/22* (2013.01)

(58) Field of Classification Search
CPC .......... H04L 67/34; H04L 67/04; H04L 67/22
See application file for complete search history.

(56) References Cited

U.S. PATENT DOCUMENTS

| 5,586,049 A * | 12/1996 | Kurtzberg | ............ G01N 21/314 |
| | | | 210/745 |
| 2009/0083686 A1 * | 3/2009 | Itaka | ........................ G06F 30/39 |
| | | | 716/118 |
| 2013/0009305 A1 * | 1/2013 | Oshida | ..................... H01L 24/03 |
| | | | 257/737 |
| 2015/0188779 A1 * | 7/2015 | McCanne | ............... H04L 63/10 |
| | | | 709/203 |

FOREIGN PATENT DOCUMENTS

CN 102867795 A 1/2013

OTHER PUBLICATIONS

International Search Report and Written Opinion for International Patent Application No. PCT/US2019/072170, dated Sep. 26, 2019, 9 pages.

* cited by examiner

*Primary Examiner* — Normin Abedin
(74) *Attorney, Agent, or Firm* — Jordan IP Law, LLC

(57) ABSTRACT

Method, systems and apparatuses may provide for technology that divides an application into a plurality of portions that are each associated with one or more functions of the application and determine a plurality of transition probabilities between the plurality of portions. Some technology may also receive at least a first portion of the plurality of portions, and receive a relation file indicating the plurality of transition probabilities between the plurality of portions.

20 Claims, 14 Drawing Sheets

US 11,297,163 B2

SCENARIO PROFILE BASED PARTITIONING AND MANAGEMENT OF APPLICATION CODE

CROSS REFERENCE TO RELATED APPLICATIONS

The present application is a U.S. National Phase Patent Application, which claims the benefit of priority to International Patent Application No. PCT/CN2019/072170 filed on Jan. 17, 2019.

TECHNICAL FIELD

Embodiments generally relate to the management of programs (e.g., applications). More particularly, embodiments relate to application distribution and storage technology.

BACKGROUND

As features of applications become more detailed and rich, the size of applications in mobile phone may also increase. For example, the top 30% of 1,000 applications in some online stores are greater than 50 megabytes. The size of the application may affect the popularity and utility of the application. For example, there may be a relation between the number of downloads and size of application. Particularly, some environments (e.g., a mobile device) may have limited resources in so far as memory, long-term storage, bandwidth, download speeds, etc., are concerned. Such limited resources may restrict the size of an application that may be realistically downloaded due to storage constraints (e.g., not enough memory or long-term storage), excessive download times, high cost to download due to high network costs, etc. Moreover, some users may download an application, test the application and then delete the application when the application fails the test. As such, almost 80% of most applications are never even utilized, resulting in inefficient network usage, power consumption and greater latencies.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1A:
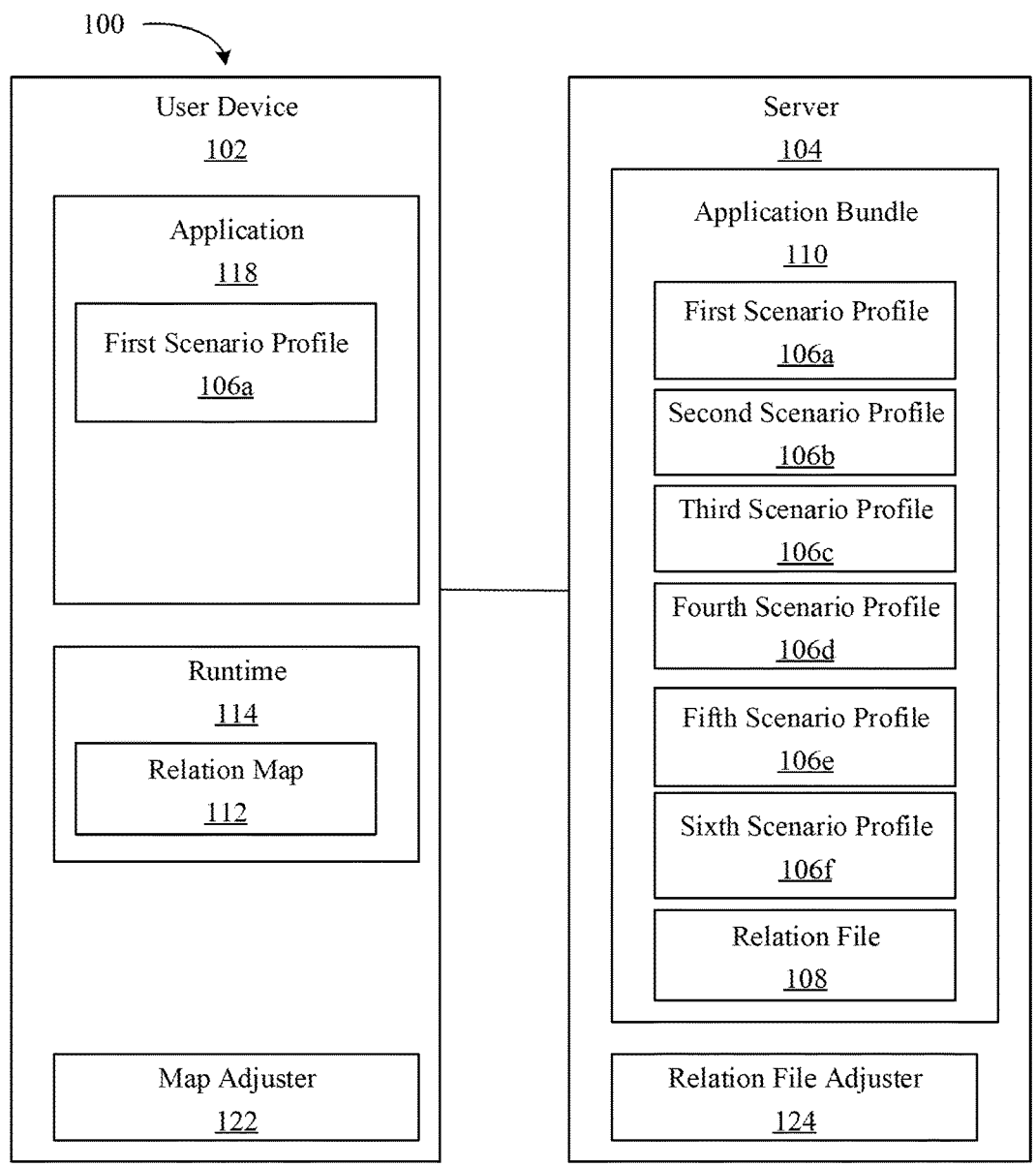
FIGS. 1A and 1B illustrate an example of an enhanced application operation and distribution process according to an embodiment.
Figure 1A:
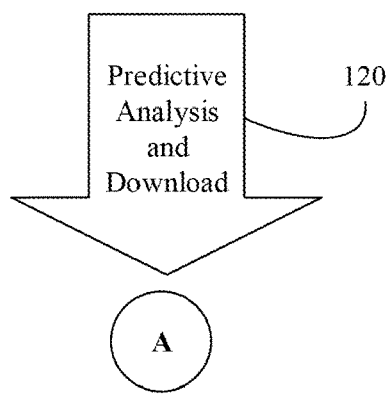

Some embodiments include a self-adaptive design to partition new or existing applications by splitting applications into smaller portions based on scenario profiles (e.g., activities and/or functions). For example, in the process of FIGS. 1A-1C, different portions of an application 118 may be automatically preloaded to a user device 102 based on predicted behavior of a user so as to reduce a size of application downloads, reduce network traffic and decrease memory usage.

A server 104 may include an application bundle 110 that includes all of the application code and/or functions of the application 118, whereas the user device 102 may only include a part of the application code of the application 118. As an example, the application 118 may be able to execute several activities, such as photo, messaging, video conferencing, etc. The server 104 may divide a copy of the application 118 (e.g., through tools during compiling) into a plurality of code portions that correspond to first, second, third, fourth, fifth and sixth scenario profiles 106a, 106b, 106c, 106d, 106e, 106f. Each of the first, second, third, fourth, fifth and sixth scenario profiles 106a, 106b, 106c, 106d, 106e, 106f may include functionality for a different activity (e.g., photo, messaging, video conferencing, etc.). Thus, each of the first, second, third, fourth, fifth and sixth scenario profiles 106a, 106b, 106c, 106d, 106e, 106f may include a source code to execute an activity of the application.

Figure 1B:
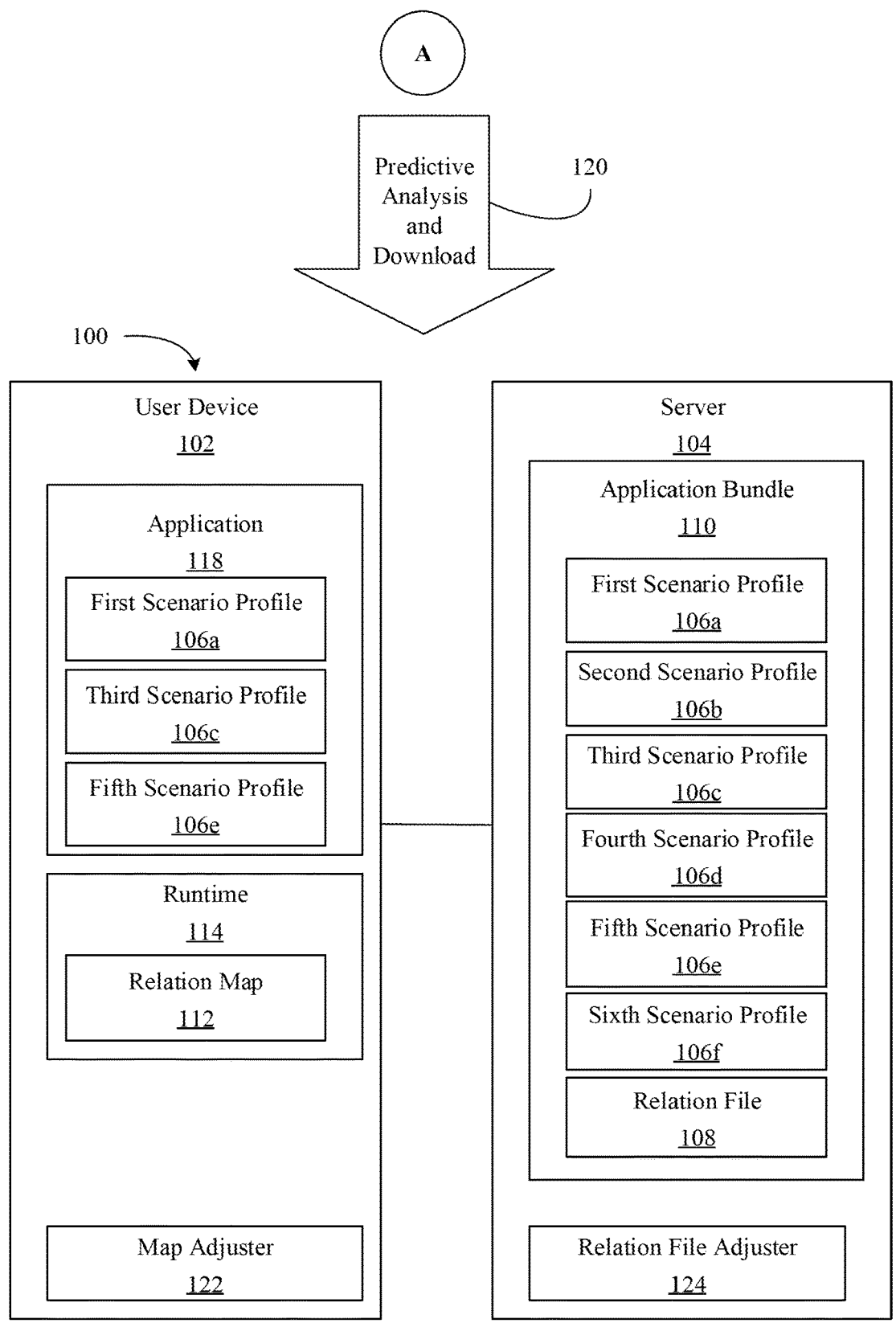
Figure 1C:
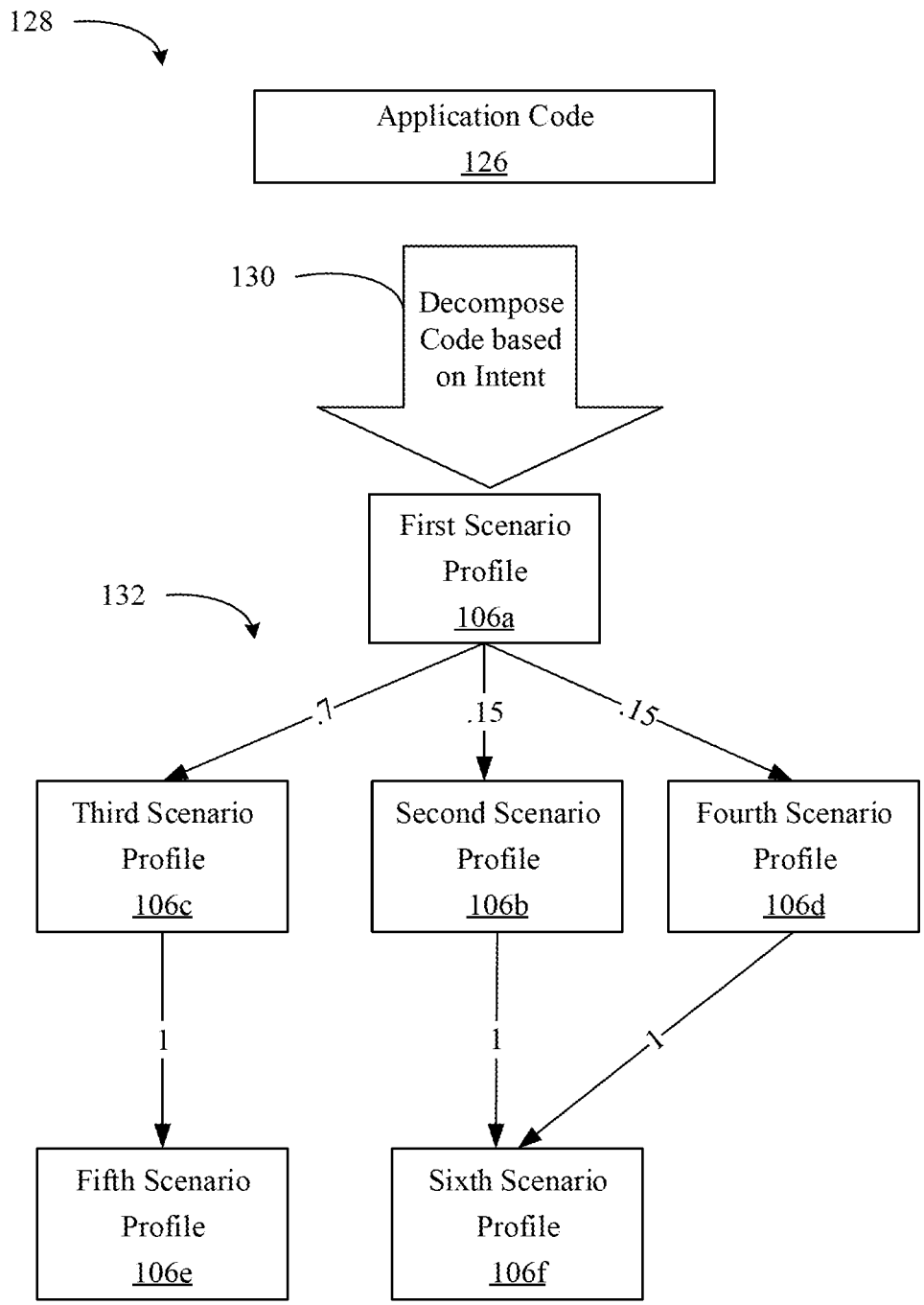
FIG. 1C illustrates an example of a process to decompose application code.

In detail, FIGS. 1A-1C illustrates an enhanced application operation and distribution process 100. The process 100 generate the application bundle 110 that includes the first, second, third, fourth, fifth and sixth scenario profiles 106a, 106b, 106c, 106d, 106e, 106f that may be selectively distributed based on predicted user actions. The first, second, third, fourth, fifth and sixth scenario profiles 106a, 106b, 106c, 106d, 106e, 106f may be different partitions and/or portions of application code of the application 118. The application bundle 110 may be utilized to build the application 118 on the user device 102 (e.g., the mobile device).

The server 104 may define transition probabilities between the first, second, third, fourth, fifth and sixth scenario profiles 106a, 106b, 106c, 106d, 106e, 106f. For example, one of the transition probabilities may represent a predictive probability that a user will select a function, that corresponds to one of the first, second, third, fourth, fifth and sixth scenario profiles 106a, 106b, 106c, 106d, 106e, 106f, while another of the functions, that corresponds to another of the first, second, third, fourth, fifth and sixth scenario profiles 106a, 106b, 106c, 106d, 106e, 106f, is selected. The server 104 may store the first, second, third, fourth, fifth and sixth scenario profiles 106a, 106b, 106c, 106d, 106e, 106f, and may further store the transition probabilities in the relation file 108. Each of the first, second, third, fourth, fifth and sixth scenario profiles 106a, 106b, 106c, 106d, 106e, 106f may include one or more packages including one or more binary libraries, classes or resources.

The user device 102 may begin downloading of the application 118 that is to be built from the application bundle 110. That is, the user device 102 may download from the server 104, an initial bundle of small mandatory packages and install the packages to satisfy the user's initial operation and setup (e.g., selection menus, initial graphics user interfaces, etc.).

The user device 102 may further access (e.g., download) the relation file 108 to generate a relation map 112. The relation map 112 may map the relationships between the first, second, third, fourth, fifth and sixth scenario profiles 106a, 106b, 106c, 106d, 106e, 106f based on the transition probabilities. The runtime 114 may refer to the relation map 112 to predict a scenario profile from the first, second, third, fourth, fifth and sixth scenario profiles 106a, 106b, 106c, 106d, 106e, 106f that the user is predicted to select based on the transition probabilities and relationships between the first, second, third, fourth, fifth and sixth scenario profiles 106a, 106b, 106c, 106d, 106e, 106f. Thus, the user device 102 may not need to download all of the first, second, third, fourth, fifth and sixth scenario profiles 106a, 106b, 106c, 106d, 106e, 106f. Rather, the user device 102 may download only the first scenario profile 106a of the first, second, third, fourth, fifth and sixth scenario profiles 106a, 106b, 106c, 106d, 106e, 106f that the runtime 114 predicts is to be utilized in the near future or as a mandatory package for initialization, while avoiding downloading of unneeded ones of the second, third, fourth, fifth and sixth scenario profiles 106b, 106c, 106d, 106e, 106f.

Thus, while running the application 118, the user device 102 may execute demand analysis and prediction based on the relation map 112 to facilitate real-time and enhanced downloading of first, second, third, fourth, fifth and sixth scenario profiles 106a, 106b, 106c, 106d, 106e, 106f in advance (before a user makes a selection) and on the fly. Therefore, the process 100 may reduce memory usage and storage usage of the user device 102 while reducing network traffic and overheads. Moreover, efficient bandwidth usage, memory and long term storage may be achieved. Additionally, the partitioning and selective downloading may be transparent to the user as the first, second, third, fourth, fifth and sixth scenario profiles 106a, 106b, 106c, 106d, 106e, 106f are automatically downloaded prior to a user's selection of the first, second, third, fourth, fifth and sixth scenario profiles 106a, 106b, 106c, 106d, 106e, 106f. Thus, process 100 may provide a medium-grained data transfer, which brings a balance between network performance and a size of application 118.

Further, application developers need not divide the applications as the server 104 may include custom tools to identify the first, second, third, fourth, fifth and sixth scenario profiles 106a, 106b, 106c, 106d, 106e, 106f. For example, when a new application is compiled by a developer, a dependency checking tool may automatically split the new application into a set of small packages (e.g., code portions) according to identified scenario profiles. Moreover, for existing applications, the dependency checking tool also may split the existing application into packages according to identified scenario profiles. An existing application may include an application that was built prior to the present process 100. Each package may include one or more of binary libraries, classes or resources. The dependency checking tool may be stored and executed on the server 104, and/or on another computing device.

As described above, the server 104 may further define transitions between the first, second, third, fourth, fifth and sixth scenario profiles 106a, 106b, 106c, 106d, 106e, 106f. The transitions may indicate how to transfer from one scenario profile from the first, second, third, fourth, fifth and sixth scenario profiles 106a, 106b, 106c, 106d, 106e, 106f to another scenario profile from the first, second, third, fourth, fifth and sixth scenario profiles 106a, 106b, 106c, 106d, 106e, 106f. For example, the application code of the application 118 may be parsed to identify transition trigger events and stored into the relation file 108. The transition trigger events may correspond to different selections by a user. For example, if a graphical user interface of the application 118 is presented on the user device 102, the transition trigger events may be the different possible selections (e.g., select music option, video option, picture option, etc.) of the user through the graphical user interface. Each transition trigger event may be assigned a probability so as to predict a most likely selection of the user to indicate which scenario profile of the first, second, third, fourth, fifth and sixth scenario profile 106a, 106b, 106c, 106d, 106e, 106f is to be downloaded. Thus, each of the first, second, third, fourth, fifth and sixth scenario profiles 106a, 106b, 106c, 106d, 106e, 106f may execute a function.

For example, turning to FIG. 1C, a process 128 to decompose application code 126 based on user intent is illustrated, and may be executed by the server 104. The application code 126 may include all of the source code for the application 118 of FIGS. 1A-1B, rather than just a portion of the source code of the application 118.

Activity switching may be mapped to a scenario profile switching in directed graph 132. Activity switching may be driven by intent. When a first activity is predicted to switch to a second activity according to user's input, a predicted intent (i.e., the predicted switch) may be sent from the first activity and/or user device 102 to the server 104, the server 104 will check the intent and be responsible for sending the second activity to the user device 102. Such intent may be identified during compile time of the application code 126 to generate the relation file 108 to record the relationship between different activities such as those illustrated by the directed graph 132. As noted, the activities correspond to first, second, third, fourth, fifth and sixth scenario profiles 106a, 106b, 106c, 106d, 106e, 106f.

The application code 126 may be decomposed based on intent 130 during a compile time of the application 118 on the server 104. Intent may correspond to the probability of transitioning from one portion of the application code 126 to another portion of the application code 126. As will be understood, the portions of the application code 126 may correspond to the first, second, third, fourth, fifth and sixth scenario profiles 106a, 106b, 106c, 106d, 106e, 106f.

As illustrated, the first scenario profile 106a may lead to second, third and fourth scenario profiles 106b, 106c, 106d. The probability of transitioning from the first scenario profile 106a to each of the second, third and fourth scenario profiles 106b, 106c, 106d is provided on the connecting lines between the first scenario profile 106a and the second, third and fourth scenario profiles 106b, 106c, 106d. In this example, the first scenario profile 106a is most likely to transition to the third scenario profile 106c, with a probability of occurrence being "0.7." As illustrated, the third scenario profile 106c only transitions to the fifth scenario profile 106e, and therefore the probability of transitioning from the third scenario profile 106c to the fifth scenario profile 106e is "1." A user device, such as the user device 102 of FIG. 1A, may recreate the directed graph 132, for example as the relation map 112, to identify the most likely scenario profiles from the first, second, third, fourth, fifth and sixth scenario profiles 106a, 106b, 106c, 106d, 106e, 106f to download during runtime.

Referring again to FIGS. 1A and 1B, when user installs the application 118 on the user device 102, the user device 102 may automatically download and install the first scenario profile 106a (e.g., login Activity and main Activity) as a mandatory initial download and the relation file 108. The runtime 114 may parse the relation file 108 into the relation map 112 which may be a directed graph data structure as illustrated by directed graph 132 of FIG. 1C, to identify the relationship between the first, second, third, fourth, fifth and sixth scenario profiles 106a, 106b, 106c, 106d, 106e, 106f. As the user operates the application 118, the runtime 114 may predict, according to the currently selected first scenario profile 106a (that is, a currently selected scenario the user is utilizing) and relation map 112, a next most likely scenario profile from the second, third, fourth fifth and sixth scenario profile 106b, 106c, 106d, 106e, 106f that is most likely to be selected by the user. The next most likely scenario profile and the corresponding packages may be downloaded.

For example, predictive analysis and download 120 may identify the next most likely scenario profile as described above. In the present example and as described above with respect to directed graph 132, the next most likely scenario profile is the third scenario profile 106c. As illustrated in FIG. 1B, user device 102 may request the third scenario profile 106c from the server 104. In response, the server 104 may transmit the third scenario profile 106c to the user device 102. The user device 102 may then install the third scenario profile 106c (e.g., packages). Thus, the user may not have actually selected the third scenario profile 106c prior to the user device 102 requesting and installing the third scenario profile 106c. Rather, the third scenario profile 106c may be downloaded and installed in response to a prediction that the user is likely to select the third scenario profile 106c. As such, the user device 102 may download a scenario profile that is not currently selected by the user.

In some embodiments, the user device 102 may predict not only the next most likely scenario profile, but also a following most likely scenario profile that will be selected after the next most likely scenario profile. In the example, the user device 102 has predicted that the third scenario profile 106c is the next most likely next scenario profile. The user device 102 may then predict the next most likely next scenario profile to follow the third scenario profile 106c as well. For example, the user device 102 may reference the relation map 112 to predict the next most likely next scenario profile from the first, second, fourth, fifth and sixth scenario profiles 106a, 106b, 106d, 106e, 106f that will be selected after the third scenario profile 106c. In the present example and as noted above, the fifth scenario profile 106e may identified as being the most probable scenario profile to occur after the third scenario profile 106c. Thus, the user device 102 may request the fifth scenario profile 106e from the server 104, and then download and install the fifth scenario profile 106e.

In some embodiments, only some of the first, second, third, fourth, fifth and sixth scenario profiles 106a, 106b, 106c, 106d, 106e, 106f of the application 118 are downloaded and installed in advance. Thus, to avoid a gap between a download time of a particular scenario profile from the first, second, third, fourth, fifth and sixth scenario profiles 106a, 106b, 106c, 106d, 106e, 106f and when the user may use the particular scenario profile, the user device 102 and/or server 104 may seek to reduce the download time and/or adjust a timing to begin downloading. For example, the download time can be divided into two parts: 1) the time consumed to transfer the particular scenario profile from the server 104 to an access network; and 2) the time consumed to transfer the particular scenario profile from the access network to the user device 102.

To reduce the time consumed to transfer the particular scenario profile from the server 104 to the access network, an edge computing or edge server placement may be used. For example, if there are a plurality of servers that host the first, second, third, fourth, fifth and sixth scenario profiles 106a, 106b, 106c, 106d, 106e, 106f, the most proximate server to the access network may be selected to reduce latency to transmit the first, second, third, fourth, fifth and sixth scenario profiles 106a, 106b, 106c, 106d, 106e, 106f to the access network relative to other possible servers (not illustrated). In this embodiment, the most proximate server may be the server 104.

To reduce the time consumed to transfer the particular scenario profile from the access network to the user device 102, downlink speeds of different access technologies may be identified. For example, a Wi-Fi (e.g., IEEE 802.11g/a standard) network may have an approximate download speed of download of 54 Mbits per second. A fifth generation wireless (5G) network may have an approximate download speed of 20 Gbps. If a size of the particular scenario profile is sufficiently small, the download time using the latest technology may be neglected. If the size of the particular scenario profile is not sufficiently small, the user device 102 and/or server 104 may adjust a timing to begin downloading by engaging in a more aggressive process. For example, the user device 102 and/or server 104 may adjust a trigger to download the particular scenario profile so that the particular scenario profile is downloaded if the particular scenario profile is in a highest probability path of the directed graph 132.

That is, the user device 102 and/or server 104 may identify a time to download more possible scenario profiles, and whether the time may cause a noticeable delay. For example, in some embodiments, the user device 102 and/or the server 104 may identify a latency of communication (e.g., bandwidth, download speeds, etc.). The user device 102 may adjust a number of the first, second, third, fourth, fifth and sixth scenario profiles 106a, 106b, 106c, 106d, 106e, 106f that are requested and downloaded based on the latency. For example, if the latency of communication meets a threshold (downloads are sufficiently slow), the user device 102 may determine that a more aggressive request and download scheme is to be adopted to request scenario profiles from the first, second, third, fourth, fifth and sixth scenario profiles 106a, 106b, 106c, 106d, 106e, 106f earlier in time.

So in the present example, the user device 102 may determine that the latency meets the threshold (e.g., the download speed may be identified as being slow). As a result, a highest probability scenario profile path may be identified to ensure that a noticeable delay does not occur. After the third scenario profile 106c is identified, the most likely scenario profile to follow the third scenario profile 106c may also be identified and requested from the server 104 prior to the third scenario profile 106c being selected by the user. In the present example, the fifth scenario profile 106e may be identified as being the most likely scenario profile to follow the third scenario profile 106c. Thus, the highest probability path of the directed graph 132 may be the third scenario profile 106c followed by the fifth scenario profile 106e. The runtime 114 may further identify the size of the fifth scenario profile 106e, and determine whether the size is sufficiently large to cause a delay. For example, if the fifth scenario profile 106e is very small, there may be no delay. If however the size is large enough relative to the bandwidth and/or download speed of the user device 102, the runtime 114 may determine that the fifth scenario profile 106e is to be downloaded.

Therefore, the fifth scenario profile 106e may be downloaded based on a probability that the fifth scenario profile 106e will follow the third scenario profile 106c, a size of the fifth scenario profile 106e relative to the latency, and identification that the latency of communication is sufficiently high. Notably, the third scenario profile 106c may not actually be selected by the user prior to the fifth scenario profile 106e being downloaded. In some embodiments, if the latency does not meet the threshold and/or the size of the fifth scenario profile 106e is sufficiently small, only the third scenario profile 106c may be downloaded.

In some embodiments, the user device 102 may further include a map adjuster 122 to adjust the transition probabilities of the relation map 112. The map adjuster 122 may determine additional information such as habits of the user, an environment (e.g., geolocation, low latency areas, noisy environment, low-light levels, etc.) associated with the user, and a time of use of the application 118. The map adjuster 122 may employ machine learning based on the additional information (which may be referred to as usage modes) to enhance prediction between the first, second, third, fourth, fifth and sixth scenario profiles 106a, 106b, 106c, 106d, 106e, 106f. Some examples of factors which may affect transition probabilities between the first, second, third, fourth, fifth and sixth scenario profiles 106a, 106b, 106c, 106d, 106e, 106f include:

1. Geolocation and/or Demographics—Users in different countries and/or different cultures may have different use modes.
2. Geolocation—A user may further use an application with different modes in office or at home which may directly affect the usage of the first, second, third, fourth, fifth and sixth scenario profiles 106a, 106b, 106c, 106d, 106e, 106f.
3. Timing—A user may use an application with different modes in daytime and at night, and/or different days.
4. Ambient sensed levels—if the user is in a noisy environment as detected by a microphone, it is less likely that the user will use certain audio features of the phone, such as video teleconferencing or other voice based communication features, unless certain conditions are met. For example, the certain conditions may include a headphone microphone or Bluetooth headset being detected as connected to the user device 102 to facilitate voice communication. As another example, if the user is in a dimly lit area, it is not very likely that the user will utilize video communication, but may increase the likeliness of a flashlight application being selected, or a reading application being selected.
5. Historical analysis—a history of a user in the application 118 or another application may predict the usage future usage patterns. For example, if the user typically utilizes online-gaming with applications, the relation map 112 may be adjusted to weight such on-line gaming scenario profiles more highly than as indicated in the relation file 108.

Thus, different usage modes may adjust the transition probabilities between the first, second, third, fourth, fifth and sixth scenario profiles 106a, 106b, 106c, 106d, 106e, 106f in the directed graph 132 constructed by the user device 102, thus affecting the runtime 114 analysis and prediction. Such additional information and/or modified transition probabilities may also be communicated to the server 104 so that the server 104 may adjust the transition probabilities of the relation file 108.

For example, the server 104 may include a relation file adjuster 124 to adjust the relation file 108. In some embodiments, the user device 102 may communicate to the server 104 when a scenario profile from the first, second, third, fourth, fifth and sixth scenario profile 106a, 106b, 106c, 106d, 106e, 106f is selected by the user, and the relation file adjuster 124 may adjust the relation file 108 accordingly. For example, if the user selects a selected scenario profile from the first, second, third, fourth, fifth and sixth scenario profile 106a, 106b, 106c, 106d, 106e, 106f that was not predicted to be the next most likely scenario profile, the relation file adjuster 124 may adjust the transition probabilities of the relation file 108 to increase the probability leading to the selected scenario profile while degrading the transition probability of an unselected scenario profile that was erroneously predicted to be the next most likely scenario profile.

In some embodiments, the user device 102 may delete downloaded ones of the first, second, third, fourth, fifth and sixth scenario profile 106a, 106b, 106c, 106d, 106e, 106f. For example, in the present example, the third and fifth scenario profiles 106c, 106e are downloaded to the user device 102. Suppose that the user selects the fifth scenario profile 106e. The runtime 114 may identify that the probability of the third scenario profile 106c being selected after the fifth scenario profile 106e is minimal and may therefore be deleted. In some embodiments, the user device 102 may delete scenario profiles in response to an identification that an available storage space (e.g., free long term storage and/or short term storage) of the user device 102 is sufficiently low, and/or that a currently stored scenario profile on the user device 102 is unlikely to be selected. In some embodiments, the scenario profile may be deleted in response to an identification that the scenario profile is unlikely to be selected for at least a predetermined number of scenario profiles after a currently selected scenario profile.

In some embodiments, if the next most likely scenario profile from the first, second, third, fourth, fifth and sixth scenario profile 106a, 106b, 106c, 106d, 106e, 106f is already downloaded onto the user device 102, the download process may be omitted to avoid redundancy. In some embodiments, some functions from the user device 102 may be shifted to the server 104. For example, the user device 102 may not request scenario profiles from the server 104. Rather, the server 104 may receive updates of the user interaction with the application 118, identify the next most likely scenario profile and then transmit the next most likely scenario profile. Thus, the functions described above may shift between the server 104 and the user device 102 based on factors such as processing power of the user device 102 and/or the server 104.

In some embodiments, the server 104 may receive the first, second, third, fourth, fifth and sixth scenario profile 106a, 106b, 106c, 106d, 106e, 106f and relation file 108 from a developer or another device for distribution as the application bundle 110. The server 104 may process older and newer application differently. For example, new applications, which have been partitioned, may be stored and unzipped to packages and a relation file. In contrast, old existing monolithic applications, which the sever 104 received prior to implementing the process 100, may be kept without modification. Such an older application may be scanned, processed and stored in the server 104 and when the older application is first required by a new device, which does not have the older application installed, the application may be processed to be divided into scenario profiles and a relation file. For an older user who has already installed the older application before, the older user may still use and upgrade the older application. In some embodiments, the older application may be replaced according to scenario profiles and relation file as described herein.

Figure 2:
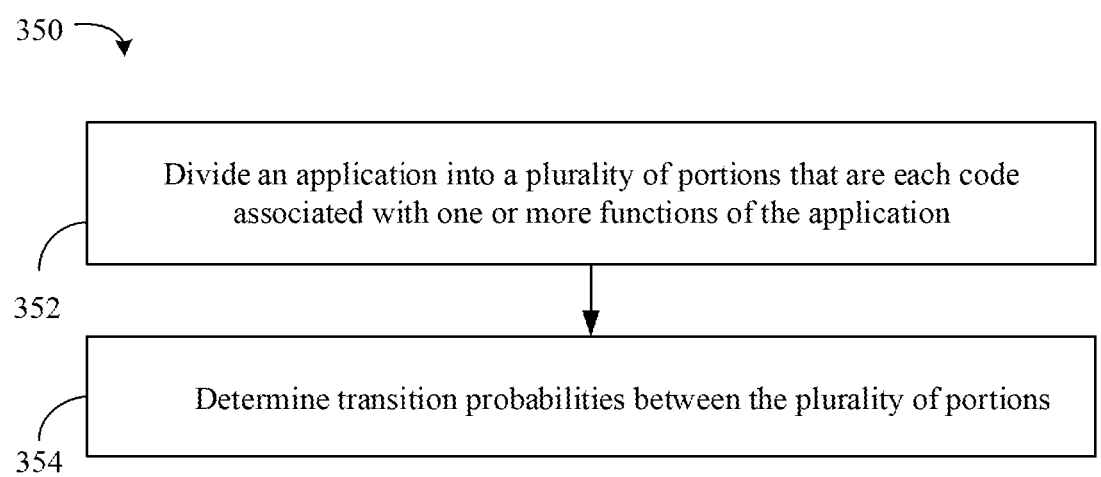
FIG. 2 is a flowchart of an example of a method of managing application transmission according to an embodiment.

FIG. 2 shows a method 350 that may provide enhanced application usage and management. The method 350 may generally be implemented by an enhanced user server, such as, for example the server 104 (FIG. 1), already discussed. In an embodiment, the method 350 is implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 350 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 352 divides an application into a plurality of portions that are each code associated with one or more functions of the application. For example, each portion of the one or more functions of the application may correspond to a function that is selectable through a graphical user interface of a user device (e.g., scenario profiles). Illustrated processing block 354 determines transition probabilities between the plurality of portions. The transition probabilities may each represent a predictive probability that a user will select at least one of the one or more functions while another of the one or more functions is selected. While not illustrated, the method may include transmitting the scenario profiles and transition probabilities to a user device.

Figure 3:
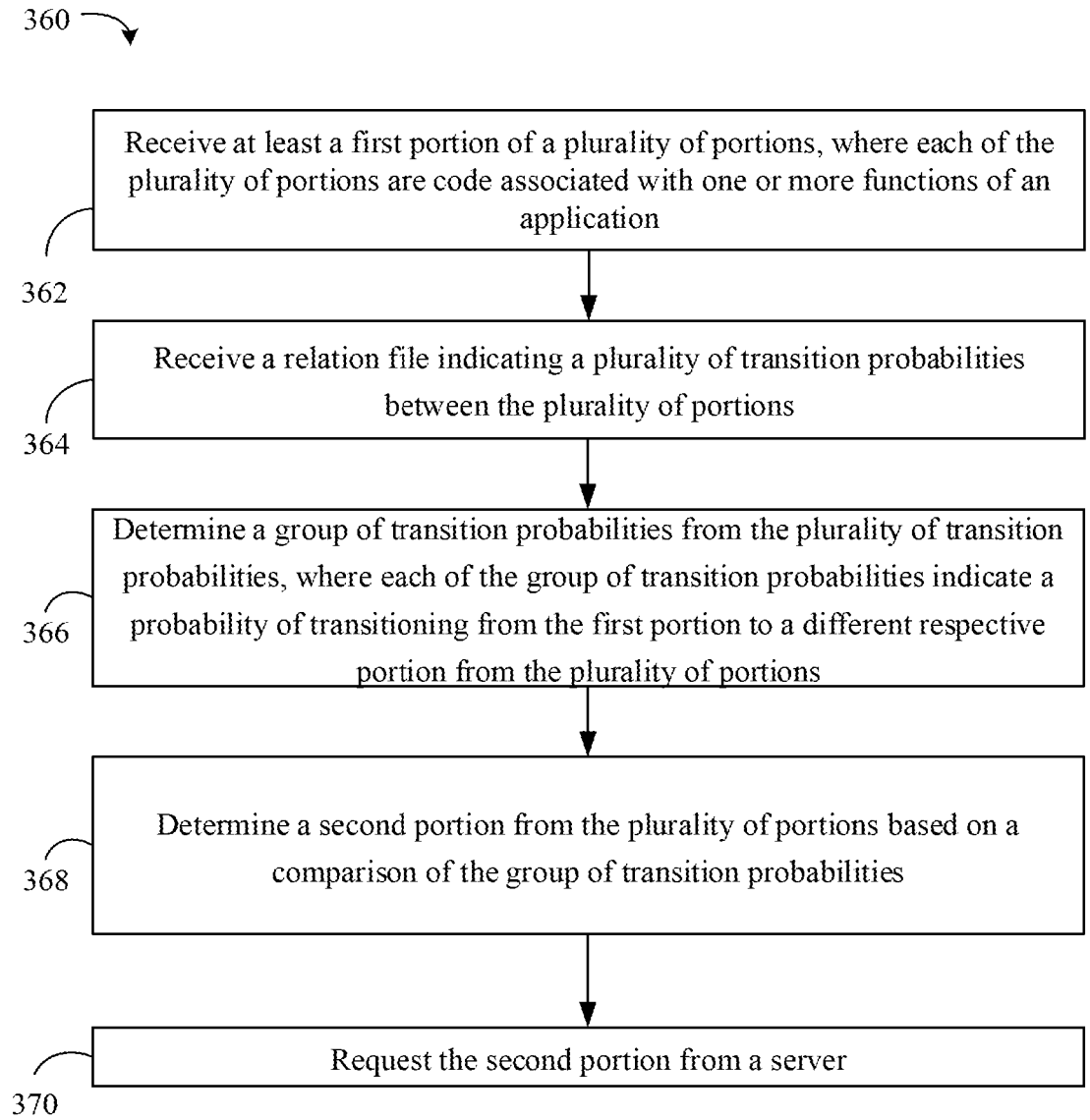
FIG. 3 is a flowchart of an example of a method of conducting an application installation and storage according to an embodiment.

FIG. 3 shows a method 360 that may provide enhanced application installation and storage. The method 360 may generally be implemented by an enhanced user device, such as, for example the user device 102 (FIG. 1), already discussed. More particularly, the method 360 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 362 receives at least a first portion of a plurality of portions, where each of the plurality of portions are code associated with one or more functions of an application. Illustrated processing block 364 receives a relation file indicating transition probabilities of transitioning between the plurality of portions. A directed graph may be built from the relation file for example. Illustrated processing block 366 determines a group of transition probabilities from the plurality of transition probabilities. Each of the group of transition probabilities may indicate a probability of transitioning from the first portion to a different respective portion from the plurality of portions. Illustrated processing block 368 determines a second portion from the plurality of portions based on a comparison of the group of transition probabilities. In some embodiments, the second portion is associated with a greatest transition probability from the group of transition probabilities. Illustrated processing block 370 requests the second portion from a server.

Figure 4:
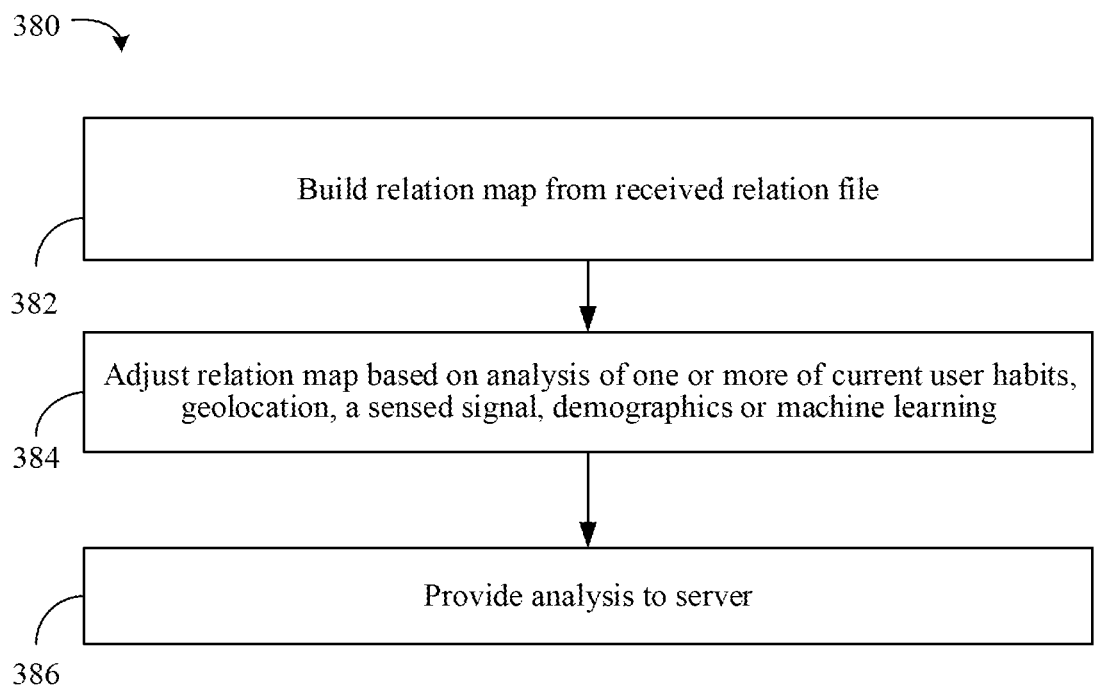
FIG. 4 is a flowchart of an example of a method of predicting user selections according to an embodiment.

FIG. 4 shows a method 380 that may provide enhanced prediction of user selections. The method 380 may generally be implemented by an enhanced user device, such as, for example the user device 102 (FIG. 1), already discussed. More particularly, the method 380 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 382 builds a relation map from a received relation file. For example, the relation map may be a directed graph including scenario profiles and transition probabilities between the scenario profiles. Illustrated processing block 384 adjusts the relation map based on one or more of current user habits (e.g., historical data of the user), geolocation of the user, a sensed signal of a sensor of the user device, demographics of the user or machine learning. Illustrated processing block 386 provides the analysis to a server which may in turn update relevant graphs and/or data based on the analysis.

Figure 5:
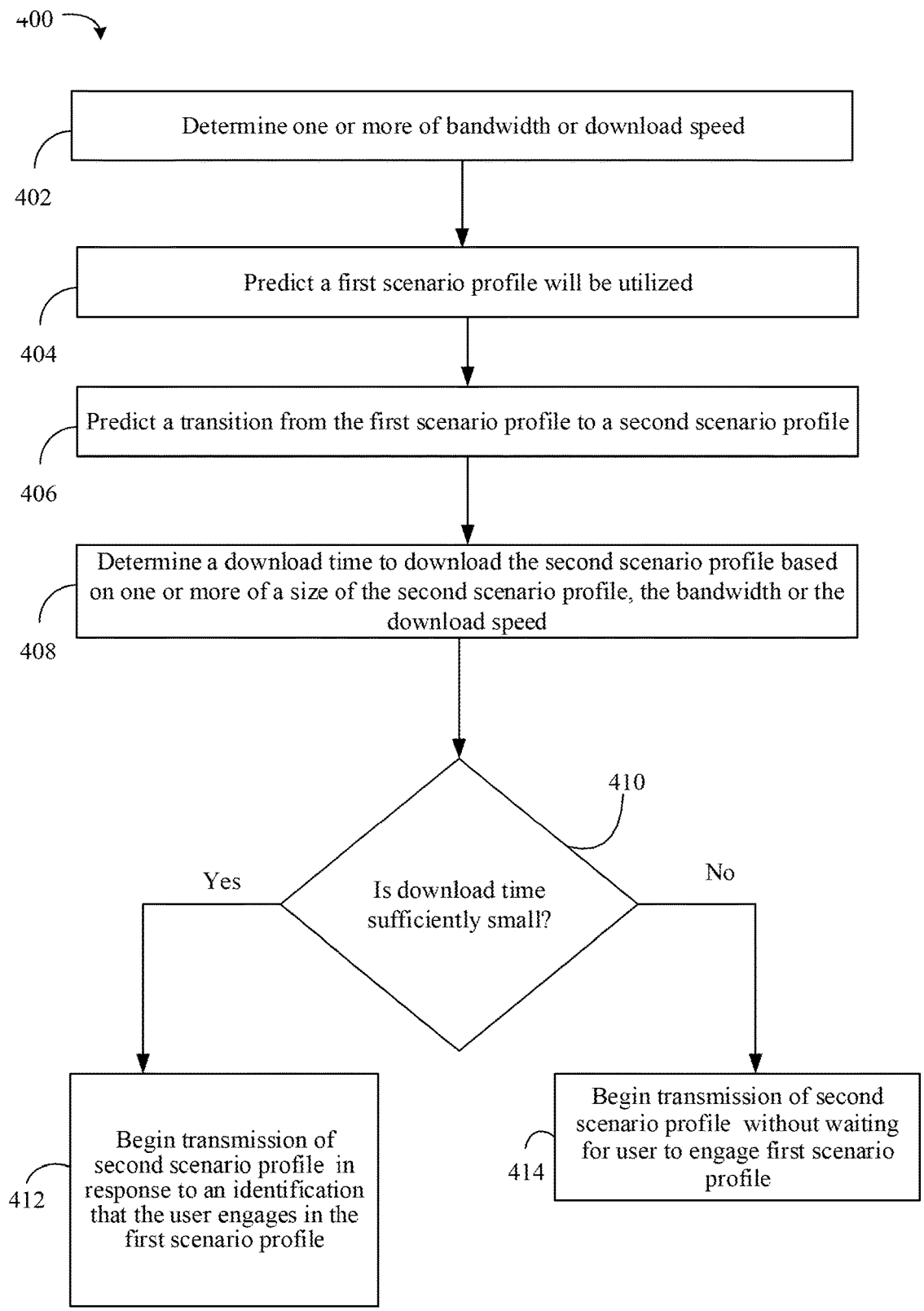
FIG. 5 is a flowchart of an example of a method of adjusting a number of downloaded scenario profiles of an application according to an embodiment.

FIG. 5 shows a method 400 that may adjust a number of scenario profiles to be downloaded based on environmental factors and sizes of the scenario profiles. The method 400 may generally be implemented by an enhanced user device and/or server, such as, for example the user device 102 and/or the server 104 (FIG. 1), already discussed. More particularly, the method 400 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 402 determines one or more of a bandwidth or a download speed of the user device. Illustrated processing block 404 may predict that a first scenario profile from a plurality of scenario profiles will be utilized by the user device. Illustrated processing block 406 predicts a transition from the first scenario profile to a second scenario profile. For example, the second scenario profile may have a transition probability from the first scenario profile that is greater than one or more other transition probabilities from the first scenario profile to one or more other scenario profiles. Illustrated processing block 408 determines a download time to download the second scenario profile based on one or more of a size of the second scenario profile, the bandwidth or the download speed. For example, block 408 may predict a time (i.e., the download time) to download the second scenario profile based on a ratio of the size to the bandwidth and/or download speed. Illustrated processing block 410 determines whether the download time is sufficiently small. For example, the download time may be considered sufficiently small if the download time is less than a certain amount of time to ensure that the user does not experience lag when utilizing an application. Block 410 therefore determines whether the second scenario profile may need to be immediately downloaded, or may be downloaded at another time.

If the download time is sufficiently small, illustrated processing block 412 may wait to download the second scenario profile. For example, processing block 412 may wait to begin downloading of the second scenario profile until the first scenario profile is engaged by the user. That is, block 412 begins transmission of second scenario profile in response to an identification that the user engages in the first scenario profile.

If the download time is not sufficiently small, illustrated processing block 414 begins transmission of the second scenario profile without waiting for the user to engage the first scenario profile. That is, if causing the user to wait for the second scenario profile to be downloaded (for example, after engagement of the first scenario profile) would cause the user to experience delays, the second scenario profile is downloaded prior to the user engaging the first scenario profile to avoid such delays.

Figure 6:
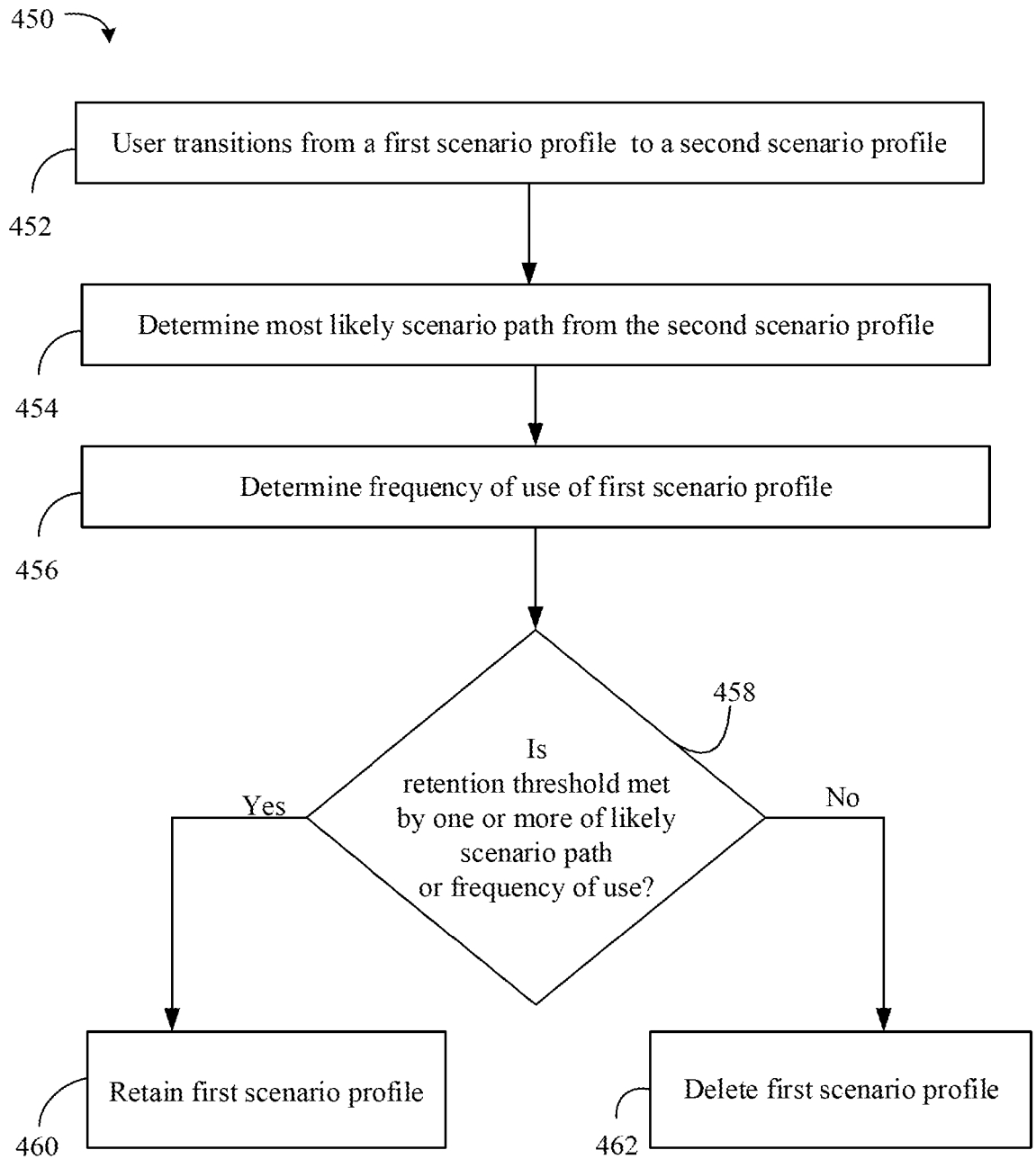
FIG. 6 is a flowchart of an example of a method of deleting scenario profiles of an application according to an embodiment.

FIG. 6 shows a method 450 that may determine whether to delete a scenario profile from a user device without deleting the entire application. The method 450 may generally be implemented by an enhanced user device and/or server, such as, for example the user device 102 and/or the server 104 (FIG. 1), already discussed. More particularly, the method 450 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 452 includes a user transitioning from a first scenario profile to a second scenario profile. For example, the user may actively engage the second scenario profile through a graphical user interface (e.g., selects a button to actuate the second scenario profile). Illustrated processing block 454 determines a most likely scenario profile path from the second scenario profile. For example, block 454 identifies a most likely path (one or more predicted scenario profiles) based on transition probabilities between the scenario profiles. Processing block 456 determines a frequency of use of the first scenario profile. Thus, block 456 may determine a historical usage of the first scenario profile.

Illustrated processing block 458 determines whether a retention threshold is met by one or more of the likely scenario profile path or frequency of user. For example, if the first scenario profile is not part of the most likely scenario profile path, and the frequency of use is historically low (e.g., the frequency of user fails to meet a frequency of use threshold), illustrated processing block 462 deletes the first scenario profile. Illustrated processing block 462 may however retain or not delete the second scenario profile. If the first scenario profile is part of the most likely scenario profile path, and/or the frequency of use is historically high, processing block 460 may retain the first scenario profile. Thus, the method 450 may enhance memory usage by removing scenario profiles that are unlikely to be reused.

Figure 7:
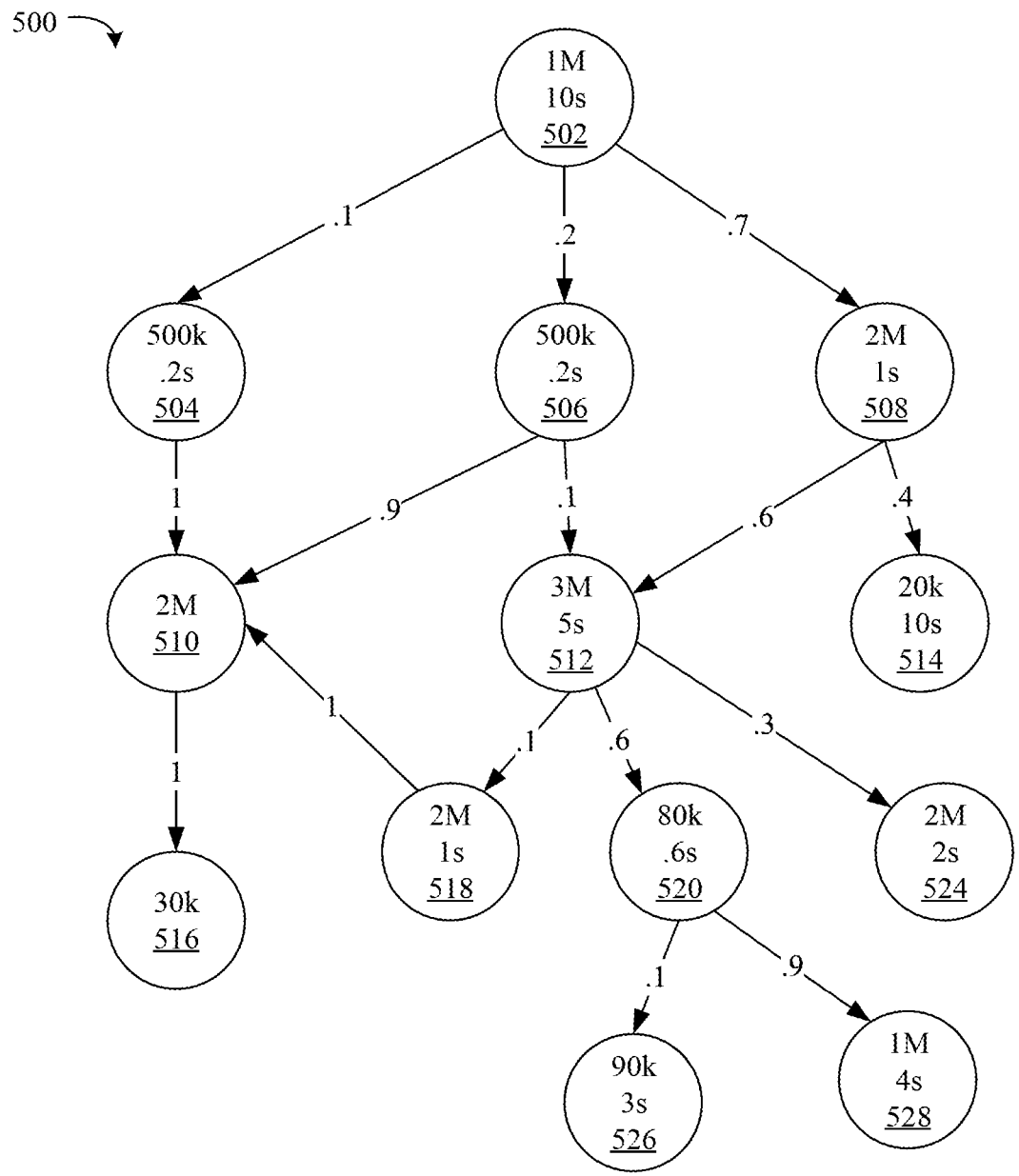
FIG. 7 is a directed graph of an example of a scenario profile prediction according to an embodiment.

FIG. 7 illustrates a directed graph 500 for scenario profile prediction. As explained above with respect to FIGS. 1A-1C, the user device 102 and/or server 104 may identify the next most probable nodes in a directed graphic from a current node in some conditions. With the directed graph 500 and current scenario profile, a runtime can predict the nodes which application requires.

In the directed graph 500, each scenario profile may be one of the nodes 502, 504, 506, 508, 512, 512, 514, 516, 516, 520, 524, 526, 528. As illustrated, each of the nodes 502, 504, 506, 508, 512, 512, 514, 516, 516, 520, 524, 526, 528 may include a size of the node (e.g., class, resource, libraries, etc.) and a predicted time that the user stays at the nodes. The transition from one scenario profile to another scenario profile may be a directed edge that includes an associated transition probability. As illustrated, the summation of the transition probabilities from any node of the nodes 502, 504, 506, 508, 512, 512, 514, 516, 516, 520, 524, 526, 528 is "1."

Node 502 may be a starting scenario profile, while node 512 may be a current scenario profile that a user is currently executing and selected. The node 512 may transition to one of nodes 518, 520, 524. As illustrated, the node 518 may transition to node 510, and node 520 may transition to one of nodes 526, 528. Therefore, the nodes 518, 520, 524 may be considered the most likely next transferred scenario profiles, whereas nodes 510, 526, 528 may be potential transferred scenario profiles in the future.

The server and/or user device may identify a most likely scenario profile path based on the transition probabilities to identify which scenario profile(s) are to be downloaded. The transition probabilities indicate that the node 520 is the most likely scenario profile path having a transition probability of 0.6, which is greater than the 0.1 transition probability to node 518 and the 0.3 transition probability to node 524. Thus, the node 520 may be part of the most likely scenario profile path.

Further, the most likely scenario profile path includes node 528. For example, the probability of transitioning from node 520 to node 528 is 0.9, which is greater than the 0.1 the probability of transitioning from node 520 to node 526.

The download times of the nodes 520, 528 of the most likely scenario profile path may be estimated based on the sizes of the nodes 520, 528, as well as download speeds and bandwidth of a user device. The user device and/or server may use the download times to determine whether to proactively download the scenario profile of the node 528. For example, node 528 may have a download time of several seconds, which is likely to cause a delay if the user selects the scenario profile of node 520, and then selects the scenario profile of node 528. That is, the possible duration which the user remains in node 520 is 0.6 seconds. If the scenario profile of the node 528 takes several seconds to download, the user may experience a delay since several seconds of download time is longer than the duration of the user remaining at node (0.6 seconds).

As such, the user device may deem such a risk unacceptable, since the download time of the scenario profile of the node 528 is several seconds, but the user is likely to only remain in node 520 for less than the download time. Therefore, the user device may download the scenario profile of the node 528 without delays, and/or as soon as the scenario profile of node 520 has finished being downloaded to mitigate any further delays.

As discussed, the directed graph 500 may be built by the server and described in a relation file. The user device may receive the relation file, and recreate the directed graph 500 from the relation file. The runtime of the application of the user device may find the most likely destination nodes according to the current node (i.e., scenario profile) based on the recreated directed graph 500. In some embodiments, the possible durations may be updated based on the user's recorded actual durations, and further provided to the server to update the relation file for future use and/or update the recreated direction graph 500.

An example of building the directed graph 500 is now provided. In some operating systems, a new application under development may include JAVA class, C/C++ libraries and resource files such as image and string. A Java Compiler (Javac) may compile the JAVA code, Clang/GNU's Not Unix (GNU) Compiler Collection (gcc) may compile C/C++ code and Android Asset Packaging Tool (Aapt) may compile resource file(s). An existing application container may include a Dalvik Executable (dex) file, C/C+=libraries and compiled resource files. Activity may be demarcated by a basic user interface unit which is used to accept user input, query the background data service and display the required information. Each activity may be regarded as a scenario profile.

When compiling a new application, the server may group the classes, resource, libraries required by a particular activity that can be grouped and implemented as a small package (scenario profile). For example, an Aapt may parse an "OperatingSystemManifest.xml" file to get information of all activities. The server may utilize information of all activities, to determine dependent java classes by the activity. Further, the server may utilize dependency analysis tools, such as "Proguide" or a Java Dependency Analysis Tool (Jdeps). Thus, the server may split one Dex file into many small Dex file according to the activity dependency. Resources may be additional files and static content that an operating system code uses, such as bitmaps, layout definitions, user interface strings, animation instructions, and more. A code in an application of the operating system may use the resources such as "R.string.hello, R.id.myimageview and R.drawable.myimage," and therefore the server may implement a tool or use existing java source code parser tool to parse the resources used by one activity and its dependent class. These resources will be added into the small Dex file created above.

In some embodiments, the directed graph 500 may be generated based on a Java Native Interface (JNI) library. For example, the JNI library is used by a java application to call the C/C++ function. Every called function in Java will be declared as a native function. Using this information, the server may identify the corresponding C/C++ functions using a dependency checking tool and re-package the corresponding C/C++ functions into a small library. In some embodiments, for an existing application, a reverse engineering tool, such as ApkTool, dex2jar, java decompiler graphical user interface (jd-gui), may help decompile the dex file to java code and/or Aapt may decompile a compiled resource file, and then a dependency tool can split and repackage them.

Figure 8:
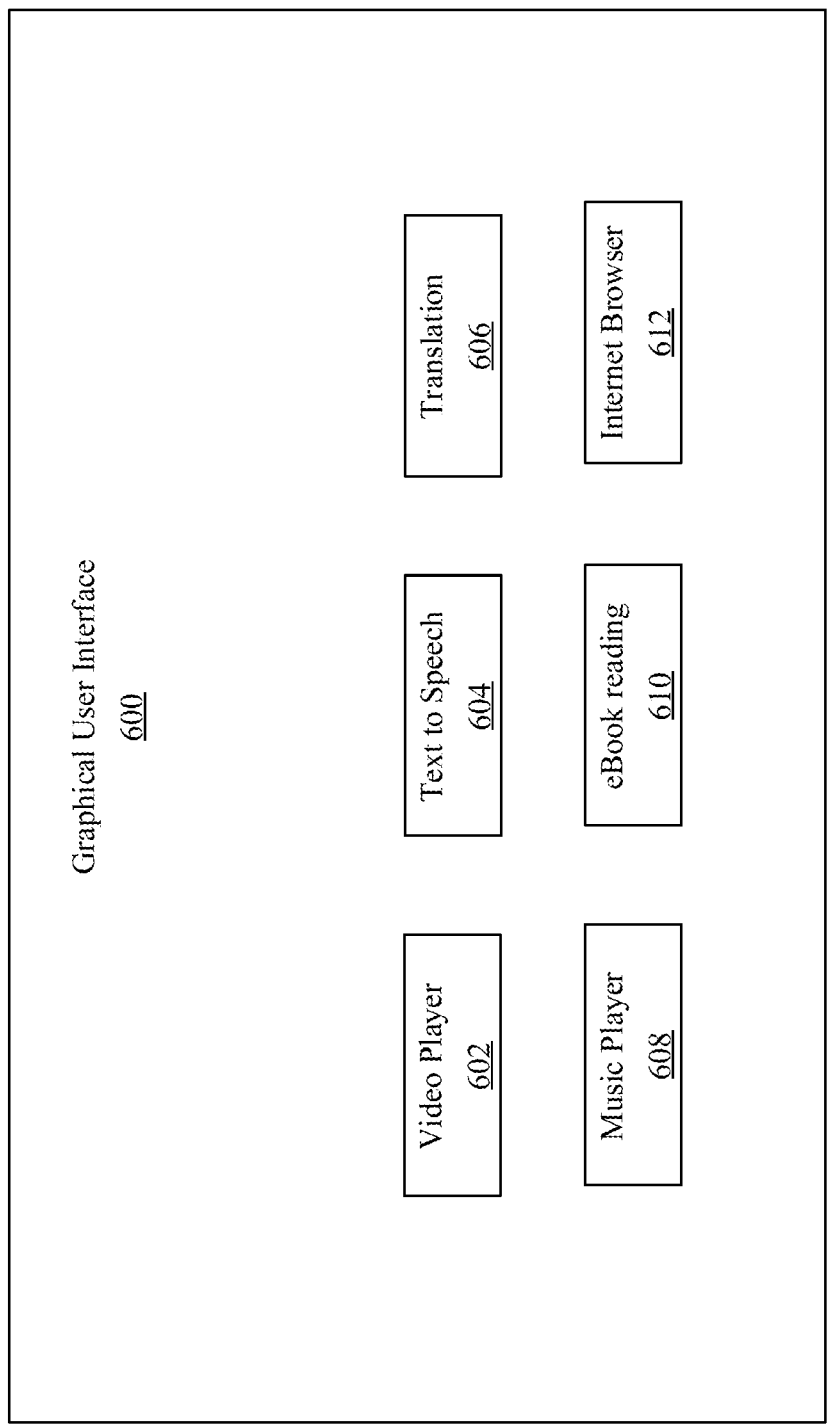
FIG. 8 is an illustration of an example of a graphical user interface according to an embodiment.

Turning to FIG. 8, a graphical user interface (GUI) 600 is illustrated. The GUI 600 may invoke several different functions, including a video player 602, text to speech 604, translation 606, music player 608, electronic book (eBook) reading 610 and internet browser 612. The user may for example select one of the video player 602, text to speech 604, translation 606, music player 608, eBook reading 610 and internet browser 612 by navigating a cursor over the corresponding area on GUI 600, or through touching the corresponding area on the GUI 600. Each of the video player 602, text to speech 604, translation 606, music player 608, eBook reading 610 and internet browser 612 may correspond to a different scenario profile. Thus, a user device may display the GUI 600. As the GUI is displayed, the user device may identify a likely scenario profile that the user will select, and automatically download that scenario profile while avoiding downloading the other scenario profiles. So for example, the user device may predict that the video player 602 will be selected, but not the text to speech 604. Thus, the scenario profile (e.g., source code) for the video player 602 may be downloaded but not the scenario profile (e.g., source code) for the text to speech 604.

Figure 9:
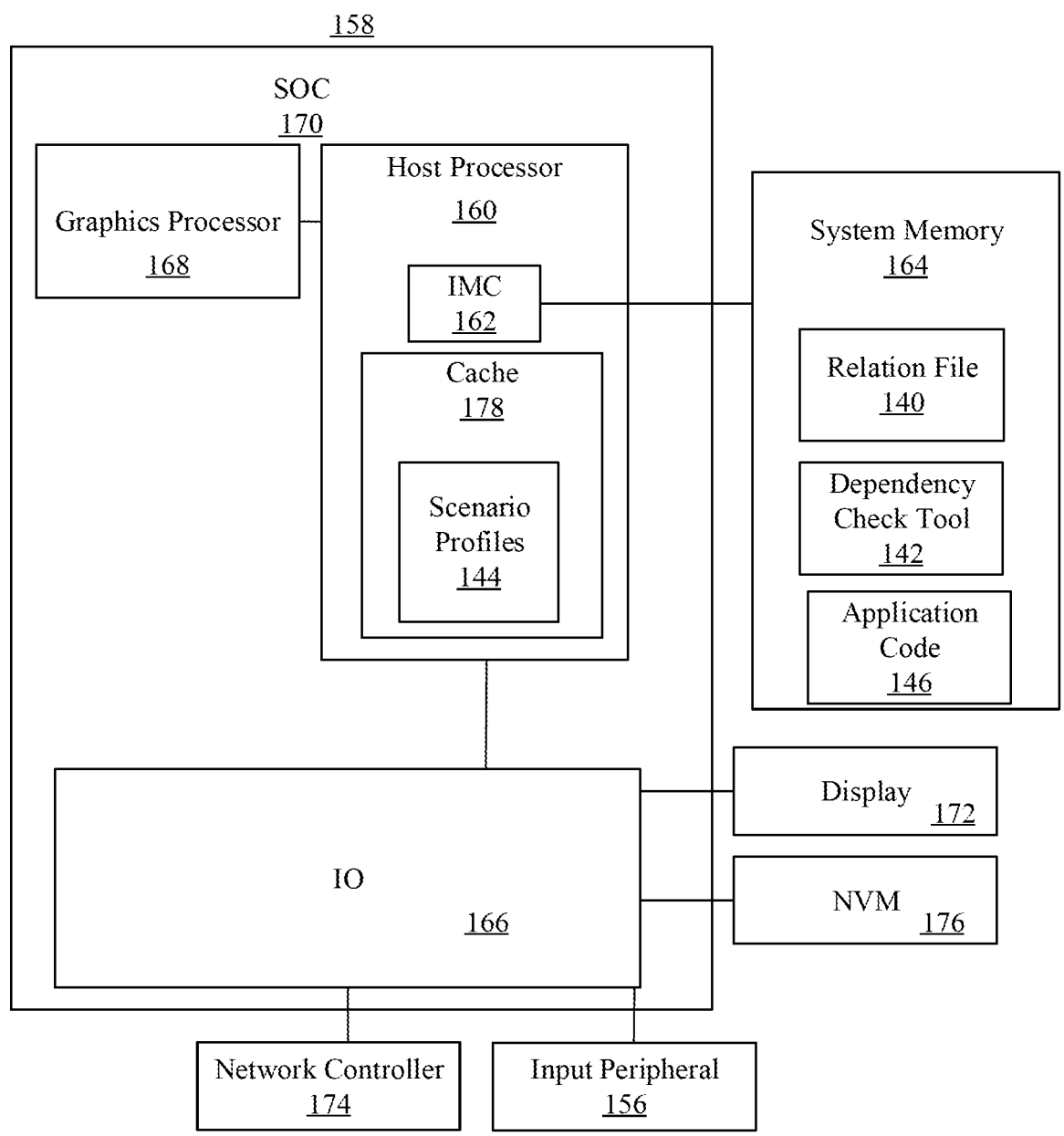
FIG. 9 is a block diagram of an example of a computing system according to an embodiment.

Turning now to FIG. 9, an enhanced application distribution computing system 158 (e.g., server) is shown. The computing system 158 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), etc., or any combination thereof. In the illustrated example, the system 158 includes a host processor 160 (e.g., CPU with one or more processor cores) having an integrated memory controller (IMC) 162 that is coupled to a system memory 164.

The illustrated system 158 also includes a graphics processor 168 (e.g., graphics processing unit/GPU) and an input output (10) module 166 implemented together with the processor 160 (e.g., as microcontrollers) on a semiconductor die 170 as a System on Chip (SOC), where the IO module 166 may communicate with, for example, a display 172 (e.g., touch screen, liquid crystal display/LCD, light emitting diode/LED display), an input peripheral 156 (e.g., mouse, keyboard, microphone), a network controller 174 (e.g., wired and/or wireless), and mass storage 176 (e.g., hard disk drive/HDD, optical disc, solid-state drive/SSD, flash memory or other non-volatile memory/NVM).

In some embodiments, the SOC 170 may utilize dependency check tool 142 to parse an application code 146 to generate a directed graph that includes transition probabilities between different scenario profiles 144 (functions) of the application code 146. In detail, the SOC 170 may implement instructions stored on, for example, the NVM 176 and/or system memory 164 to parse the application code 146. The directed graph may be stored as a relation file 140 in the system memory 164.

The host processor 160 may communicate with another computing device (e.g., a user device) via the network controller 174. The user device may request an installation of the application code 146. Rather than sending the entire application code 146, the host processor 160 may only provide scenario profiles from the scenario profiles 144 that may be required to initiate the application, and further provide the relation file 140. The remaining scenario profiles 144 may not be transmitted. Rather, the host processor 158 may receive requests from the user device for more scenario profiles of the scenario profiles 144. For example, the user device may engage in predictive analysis of a user's behavior based on the relation file 140 and a currently selected scenario profile on the user device.

The host processor 160 may store the scenario profiles 144 in the cache 178 to facilitate low latency access to the scenario profiles 144 for transmission to the user device. In contrast, the relation file 140 may be stored in the system memory 164 since the relation file 140 may not be needed after the relation file 140 is transmitted to the user device. Thus, an enhanced application distribution scheme is provided to reduce latency, reduce memory usage and decrease network traffic.

Figure 10:
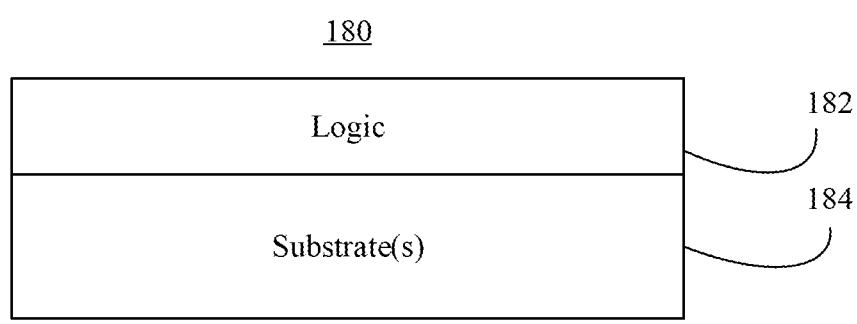
FIG. 10 is an illustration of an example of a semiconductor apparatus according to an embodiment.

FIG. 10 shows a semiconductor package apparatus 180. The illustrated apparatus 180 includes one or more substrates 184 (e.g., silicon, sapphire, gallium arsenide) and logic 182 (e.g., transistor array and other integrated circuit/IC components) coupled to the substrate(s) 184. In one example, the logic 182 is implemented at least partly in configurable logic or fixed-functionality logic hardware. The logic 182 may implement one or more aspects of the process 100 (FIG. 1), the method 350 (FIG. 2), method 360 (FIG. 3), method 380 (FIG. 4), method 400 (FIG. 5) and/or method 450 (FIG. 6) already discussed. In some embodiments, the logic 182 may divide an application into a plurality of portions that are each associated with one or more functions of the application to determine transition probabilities between the plurality of portions. The logic 182 may further provide one or more of portions and the probabilities to a computing device. The logic 182 may receive requests for further portions of the application from the another computing device and provide the further portions to the another computing device. In one example, the logic 182 includes transistor channel regions that are positioned (e.g., embedded) within the substrate(s) 184. Thus, the interface between the logic 182 and the substrate(s) 184 may not be an abrupt junction. The logic 182 may also be considered to include an epitaxial layer that is grown on an initial wafer of the substrate(s) 184.

Figure 11:
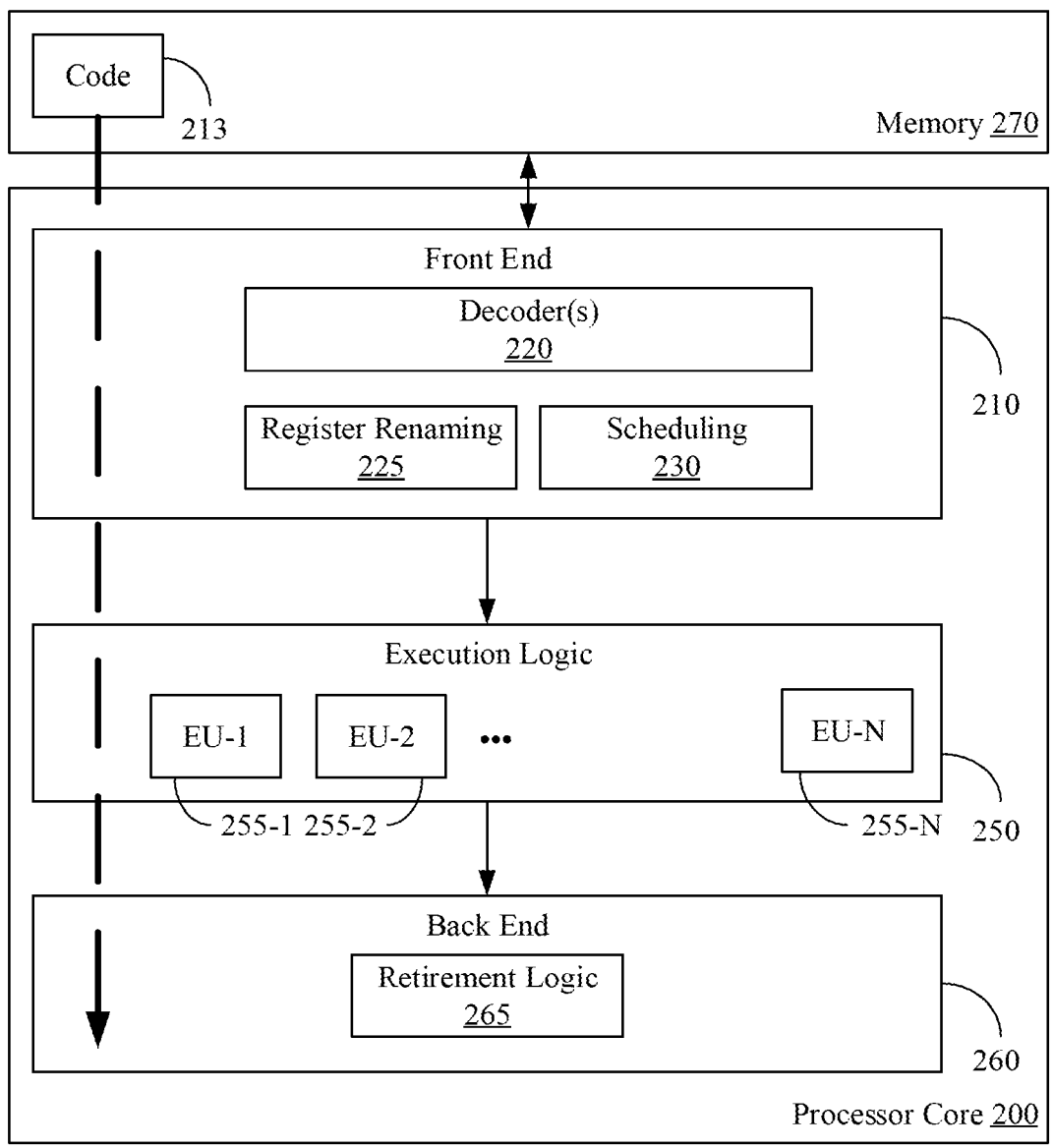
FIG. 11 is a block diagram of an example of a processor according to an embodiment.

FIG. 11 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 11, a processing element may alternatively include more than one of the processor core 200 illustrated in FIG. 11. The processor core 200 may be a single-threaded core or, for at least one embodiment, the processor core 200 may be multithreaded in that it may include more than one hardware thread context (or "logical processor") per core.

FIG. 11 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the process 100 (FIG. 1), the method 350 (FIG. 2), method 360 (FIG. 3), method 380 (FIG. 4), method 400 (FIG. 5) and/or method 450 (FIG. 6) already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 11, a processing element may include other elements on chip with the processor core 200. For example, a processing element may include memory control logic along with the processor core 200. The processing element may include input/output (I/O) control logic and/or may include I/O control logic integrated with memory control logic. The processing element may also include one or more caches.

Figure 12:
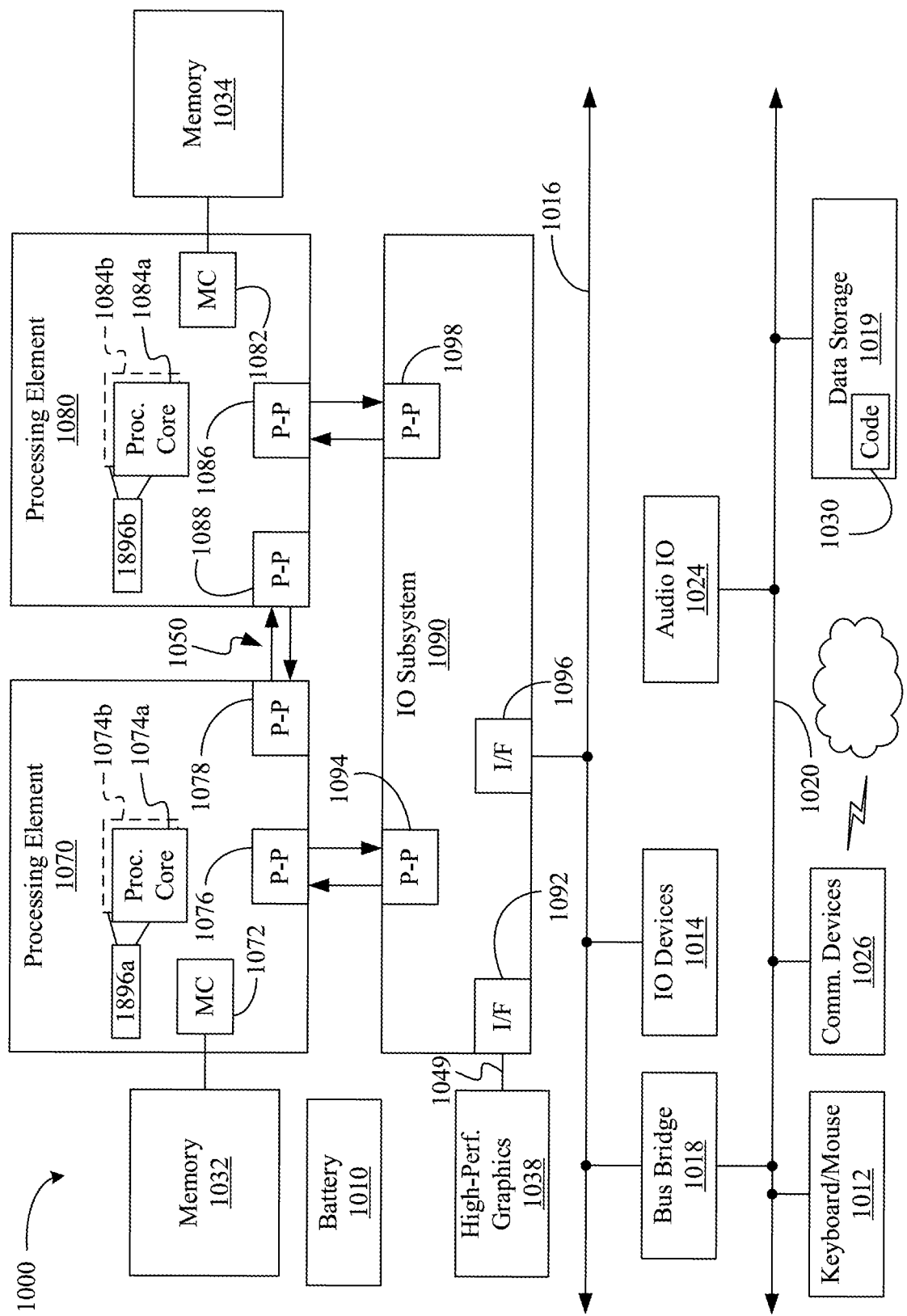
FIG. 12 is a block diagram of an example of a multi-processor based computing system according to an embodiment.

Referring now to FIG. 12, shown is a block diagram of a computing system 1000 embodiment in accordance with an embodiment. Shown in FIG. 12 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 12 may be implemented as a multi-drop bus rather than point-to-point interconnect.

As shown in FIG. 12, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 11.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 12, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 12, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of the process 100 (FIG. 1), the method 350 (FIG. 2), method 360 (FIG. 3), method 380 (FIG. 4), method 400 (FIG. 5) and/or method 450 (FIG. 6) already discussed. Further, an audio I/O 1024 may be coupled to second bus 1020 and a battery 1010 may supply power to the computing system 1000.

Note that other embodiments are contemplated. For example, instead of the point-to-point architecture of FIG. 12 a system may implement a multi-drop bus or another such communication topology. Also, the elements of FIG. 12 may alternatively be partitioned using more or fewer integrated chips than shown in FIG. 12.

ADDITIONAL NOTES AND EXAMPLES

Example 1 may include a semiconductor apparatus including one or more substrates, and logic coupled to the one or more substrates, wherein the logic is implemented in one or more of configurable logic or fixed-functionality logic hardware, the logic coupled to the one or more substrates to receive at least a first portion of a plurality of portions, wherein each of the plurality of portions is code associated with one or more different functions of an application, and receive a relation file indicating a plurality of transition probabilities between the plurality of portions.

Example 2 may include the semiconductor apparatus of example 1, wherein the logic is to determine a group of transition probabilities from the plurality of transition probabilities, wherein each transition probability of the group of transition probabilities indicates a probability of transitioning from the first portion to a different respective portion from the plurality of portions, determine a second portion from the plurality of portions based on a comparison of the group of transition probabilities, and request the second portion from a server.

Example 3 may include the semiconductor apparatus of example 2, wherein a greatest transition probability from the group of transition probabilities is a transition probability from the first portion to the second portion.

Example 4 may include the semiconductor apparatus of example 2, wherein the logic is to determine a latency associated with one or more of a download speed or a bandwidth, and determine whether to request a third portion of the plurality of portions based on the latency and the relation file, wherein according to the relation file, the second portion is to transition to the third portion.

Example 5 may include the semiconductor apparatus of example 4, wherein the logic is to determine whether to request the third portion based on a size of the third portion.

Example 6 may include the semiconductor apparatus of example 1, wherein the logic is to adjust the plurality of transition probabilities based on one or more of current habits of a user, geolocation, a sensed signal, demographics of the user or machine learning.

Example 7 may include the semiconductor apparatus of example 1, wherein the logic coupled to the one or more substrates includes transistor channel regions that are positioned within the one or more substrates.

Example 8 may include at least one computer readable storage medium including a set of executable program instructions, which when executed by a computing system, cause the computing system to receive at least a first portion of a plurality of portions, wherein each of the plurality of portions is code associated with one or more different functions of an application, and receive a relation file indicating a plurality of transition probabilities between the plurality of portions.

Example 9 may include the at least one computer readable storage medium of example 8, wherein the executable program instructions, when executed by the computing system, cause the computing system to determine a group of transition probabilities from the plurality of transition probabilities, wherein each transition probability of the group of transition probabilities indicates a probability of transitioning from the first portion to a different respective portion from the plurality of portions, determine a second portion from the plurality of portions based on a comparison of the group of transition probabilities, and request the second portion from a server.

Example 10 may include the at least one computer readable storage medium of example 9, wherein a greatest transition probability from the group of transition probabilities is a transition probability from the first portion to the second portion.

Example 11 may include the at least one computer readable storage medium of example 9, wherein the executable program instructions, when executed by the computing system, cause the computing system to determine a latency associated with one or more of a download speed of the computing system or a bandwidth of the computing system, and determine whether to request a third portion of the plurality of portions based on the latency and the relation file, wherein according to the relation file, the second portion is to transition to the third portion.

Example 12 may include the at least one computer readable storage medium of example 11, wherein the executable program instructions, when executed by the computing system, cause the computing system to determine whether to request the third portion based on a size of the third portion.

Example 13 may include the at least one computer readable storage medium of example 8, wherein the executable program instructions, when executed by the computing system, cause the computing system to adjust the plurality of transition probabilities based on one or more of current habits of a user, geolocation, a sensed signal, demographics of the user or machine learning.

Example 14 may include at least one computer readable storage medium including a set of executable program instructions, which when executed by a computing system, cause the computing system to divide an application into a plurality of portions that are each code associated with one or more functions of the application, and determine a plurality of transition probabilities between the plurality of portions.

Example 15 may include the at least one computer readable storage medium of example 14, wherein each of the functions of the application is selectable through a graphical user interface.

Example 16 may include the at least one computer readable storage medium of example 14, wherein the transition probabilities each represent a predictive probability that a user will select a respective one of the functions.

Example 17 may include the at least one computer readable storage medium of example 14, wherein the executable program instructions, when executed by the computing system, cause the computing system to identify that a first portion of the plurality of portions is to be transmitted to a user device, and receive an indication that a second portion of the plurality of portions is to be transmitted to the user device, wherein a first group of transition probabilities from the plurality of transition probabilities each indicate a predictive probability of transitioning from the first portion to a different respective portion from the plurality of portions, and a transition probability from the first group, that is between the first portion and the second portion, is greatest out of the first group.

Example 18 may include the at least one computer readable storage medium of example 14, wherein the executable program instructions, when executed by the computing system, cause the computing system to generate a relation file that is to be utilized to generate a directed graph of the plurality of portions and the transition probabilities, wherein in the directed graph, each of the transition probabilities indicates a probability of transitioning between two different portions of the plurality of portions, and transmit the relation file to a user device.

Example 19 may include the at least one computer readable storage medium of example 14, wherein the executable program instructions, when executed by the computing system, cause the computing system to receive user generated selections of the plurality of portions, and adjust the transition probabilities based on the received user generated selections.

Example 20 may include a semiconductor apparatus including one or more substrates, and logic coupled to the one or more substrates, wherein the logic is implemented in one or more of configurable logic or fixed-functionality logic hardware, the logic coupled to the one or more substrates to divide an application into a plurality of portions that are each code associated with one or more functions of the application, and determine a plurality of transition probabilities between the plurality of portions.

Example 21 may include the semiconductor apparatus of example 20, wherein each of the functions of the application is selectable through a graphical user interface.

Example 22 may include the semiconductor apparatus of example 20, wherein the transition probabilities each represent a predictive probability that a user will select a respective one of the functions.

Example 23 may include the semiconductor apparatus of example 20, wherein the logic is to identify that a first portion of the plurality of portions is to be transmitted to a user device, and receive an indication that a second portion of the plurality of portions is to be transmitted to the user device, wherein a first group of transition probabilities from the plurality of transition probabilities each indicate a predictive probability of transitioning from the first portion to a different respective portion from the plurality of portions, and a transition probability from the first group, that is between the first portion and the second portion, is greatest out of the first group.

Example 24 may include the semiconductor apparatus of example 20, wherein the logic is to receive user generated selections of the plurality of portions, and adjust the transition probabilities based on the received user generated selections.

Example 25 may include the semiconductor apparatus of example 20, wherein the logic coupled to the one or more substrates includes transistor channel regions that are positioned within the one or more substrates.

Example 26 may include a semiconductor apparatus including means for receiving at least a first portion of a plurality of portions, wherein each of the plurality of portions is code associated with one or more different functions of an application, and means for receiving a relation file indicating a plurality of transition probabilities between the plurality of portions.

Example 27 may include the semiconductor apparatus of example 26, further including means for determining a group of transition probabilities from the plurality of transition probabilities, wherein each transition probability of the group of transition probabilities indicates a probability of transitioning from the first portion to a different respective portion from the plurality of portions, means for determining a second portion from the plurality of portions based on a comparison of the group of transition probabilities, and means for requesting the second portion from a server.

Example 28 may include the semiconductor apparatus of example 27, wherein a greatest transition probability from the group of transition probabilities is a transition probability from the first portion to the second portion.

Example 29 may include the semiconductor apparatus of example 27, further including means for determining a latency associated with one or more of a download speed or a bandwidth, and means for determining whether to request a third portion of the plurality of portions based on the latency and the relation file, wherein according to the relation file, the second portion is to transition to the third portion.

Example 30 may include the semiconductor apparatus of example 29, further including means for determining whether to request the third portion based on a size of the third portion.

Example 31 may include the semiconductor apparatus of example 26, further including means for adjusting the plurality of transition probabilities based on one or more of current habits of a user, geolocation, a sensed signal, demographics of the user or machine learning.

Example 32 may include a semiconductor apparatus including means for dividing an application into a plurality of portions that are each code associated with one or more functions of the application, and means for determining a plurality of transition probabilities between the plurality of portions.

Example 33 may include the semiconductor apparatus of example 32, wherein each of the functions of the application is selectable through a graphical user interface.

Example 34 may include the semiconductor apparatus of example 32, wherein the transition probabilities each represent a predictive probability that a user will select a respective one of the functions.

Example 35 may include the semiconductor apparatus of example 32, further including means for identifying that a first portion of the plurality of portions is to be transmitted to a user device, and means for receiving an indication that a second portion of the plurality of portions is to be transmitted to the user device, wherein a first group of transition probabilities from the plurality of transition probabilities each indicate a predictive probability of transitioning from the first portion to a different respective portion from the plurality of portions, and a transition probability from the first group, that is between the first portion and the second portion, is greatest out of the first group.

Example 36 may include the semiconductor apparatus of example 32, further including means for generating a relation file that is to be utilized to generate a directed graph of the plurality of portions and the transition probabilities, wherein in the directed graph, each of the transition probabilities indicates a probability of transitioning between two different portions of the plurality of portions, and means for transmitting the relation file to a user device.

Example 37 may include the semiconductor apparatus of example 32, further including means for receiving user generated selections of the plurality of portions, and means for adjusting the transition probabilities based on the received user generated selections.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction.

This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A semiconductor apparatus comprising:
one or more substrates; and
logic coupled to the one or more substrates, wherein the logic is implemented in one or more of configurable logic or fixed-functionality logic hardware, the logic coupled to the one or more substrates to:
receive at least a first portion of a plurality of portions, wherein each of the plurality of portions is code associated with one or more different functions of an application; and receive a relation file indicating a plurality of transition probabilities between the plurality of portions.

2. The semiconductor apparatus of claim 1, wherein the logic is to:
determine a group of transition probabilities from the plurality of transition probabilities, wherein each transition probability of the group of transition probabilities indicates a probability of transitioning from the first portion to a different respective portion from the plurality of portions;
determine a second portion from the plurality of portions based on a comparison of the group of transition probabilities; and
request the second portion from a server.

3. The semiconductor apparatus of claim 2, wherein a greatest transition probability from the group of transition probabilities is a transition probability from the first portion to the second portion.

4. The semiconductor apparatus of claim 2, wherein the logic is to:
determine a latency associated with one or more of a download speed or a bandwidth; and
determine whether to request a third portion of the plurality of portions based on the latency and the relation file, wherein according to the relation file, the second portion is to transition to the third portion.

5. The semiconductor apparatus of claim 4, wherein the logic is to determine whether to request the third portion based on a size of the third portion.

6. The semiconductor apparatus of claim 1, wherein the logic is to adjust the plurality of transition probabilities based on one or more of current habits of a user, geolocation, a sensed signal, demographics of the user or machine learning.

7. The semiconductor apparatus of claim 1, wherein the logic coupled to the one or more substrates includes transistor channel regions that are positioned within the one or more substrates.

8. At least one computer readable storage medium comprising a set of executable program instructions, which when executed by a computing system, cause the computing system to:
receive at least a first portion of a plurality of portions, wherein each of the plurality of portions is code associated with one or more different functions of an application; and
receive a relation file indicating a plurality of transition probabilities between the plurality of portions.

9. The at least one computer readable storage medium of claim 8, wherein the executable program instructions, when executed by the computing system, cause the computing system to:
determine a group of transition probabilities from the plurality of transition probabilities, wherein each transition probability of the group of transition probabilities indicates a probability of transitioning from the first portion to a different respective portion from the plurality of portions;
determine a second portion from the plurality of portions based on a comparison of the group of transition probabilities; and
request the second portion from a server.

10. The at least one computer readable storage medium of claim 9, wherein a greatest transition probability from the group of transition probabilities is a transition probability from the first portion to the second portion.

11. The at least one computer readable storage medium of claim 9, wherein the executable program instructions, when executed by the computing system, cause the computing system to:
determine a latency associated with one or more of a download speed of the computing system or a bandwidth of the computing system; and
determine whether to request a third portion of the plurality of portions based on the latency and the relation file, wherein according to the relation file, the second portion is to transition to the third portion.

12. The at least one computer readable storage medium of claim 11, wherein the executable program instructions, when executed by the computing system, cause the computing system to determine whether to request the third portion based on a size of the third portion.

13. At least one computer readable storage medium comprising a set of executable program instructions, which when executed by a computing system, cause the computing system to:
divide an application into a plurality of portions that are each code associated with one or more functions of the application; and
determine a plurality of transition probabilities between the plurality of portions.

14. The at least one computer readable storage medium of claim 13, wherein the transition probabilities each represent a predictive probability that a user will select a respective one of the functions.

15. The at least one computer readable storage medium of claim 13, wherein the executable program instructions, when executed by the computing system, cause the computing system to:
identify that a first portion of the plurality of portions is to be transmitted to a user device; and
receive an indication that a second portion of the plurality of portions is to be transmitted to the user device;
wherein:
a first group of transition probabilities from the plurality of transition probabilities each indicate a predictive probability of transitioning from the first portion to a different respective portion from the plurality of portions; and
a transition probability from the first group, that is between the first portion and the second portion, is greatest out of the first group.

16. The at least one computer readable storage medium of claim 13, wherein the executable program instructions, when executed by the computing system, cause the computing system to:
generate a relation file that is to be utilized to generate a directed graph of the plurality of portions and the transition probabilities, wherein in the directed graph, each of the transition probabilities indicates a probability of transitioning between two different portions of the plurality of portions; and
transmit the relation file to a user device.

17. A semiconductor apparatus comprising:
one or more substrates; and
logic coupled to the one or more substrates, wherein the logic is implemented in one or more of configurable logic or fixed-functionality logic hardware, the logic coupled to the one or more substrates to:
divide an application into a plurality of portions that are each code associated with one or more functions of the application; and determine a plurality of transition probabilities between the plurality of portions.

18. The semiconductor apparatus of claim 17, wherein the transition probabilities each represent a predictive probability that a user will select a respective one of the functions.

19. The semiconductor apparatus of claim 17, wherein the logic is to:
- identify that a first portion of the plurality of portions is to be transmitted to a user device; and
- receive an indication that a second portion of the plurality of portions is to be transmitted to the user device;

wherein:
- a first group of transition probabilities from the plurality of transition probabilities each indicate a predictive probability of transitioning from the first portion to a different respective portion from the plurality of portions; and
- a transition probability from the first group, that is between the first portion and the second portion, is greatest out of the first group.

20. The semiconductor apparatus of claim 17, wherein the logic coupled to the one or more substrates includes transistor channel regions that are positioned within the one or more substrates.

* * * * *